(12) United States Patent
Jin et al.

(10) Patent No.: US 7,956,117 B2
(45) Date of Patent: *Jun. 7, 2011

(54) DIRECTLY PAINTABLE POLYPROPYLENE-BASED COMPOSITE COMPOSITION

(75) Inventors: Yang Seog Jin, Seongnam-si (KR); Seong Ki Park, Yongin-si (KR); Chang Woo Jin, Gunpo-si (KR); Chan Ki Lee, Gwangmyeong-si (KR); Se Hyun Cho, Seongnam-si (KR)

(73) Assignee: Polymersnet Co., Ltd., Jeongwang-Dong, Siheung-Si, Gyeonggi-Do (KR)

( * ) Notice: Subject to any disclaimer, the term of this patent is extended or adjusted under 35 U.S.C. 154(b) by 103 days.

This patent is subject to a terminal disclaimer.

(21) Appl. No.: 11/312,100

(22) Filed: Dec. 20, 2005

(65) Prior Publication Data

US 2006/0189761 A1    Aug. 24, 2006

(30) Foreign Application Priority Data

Feb. 17, 2005  (KR) .................. 10-2005-0013104

(51) Int. Cl.
*C08K 3/26* (2006.01)
*C08L 31/00* (2006.01)
*C09D 123/12* (2006.01)

(52) U.S. Cl. ............ 524/451; 524/505; 525/70; 525/80; 525/93

(58) Field of Classification Search .................. 524/505, 524/451; 525/93, 70, 80
See application file for complete search history.

(56) References Cited

U.S. PATENT DOCUMENTS

| | | | |
|---|---|---|---|
| 3,085,082 A | | 4/1963 | Baer et al. |
| 3,410,931 A | | 11/1968 | Johnson |
| 4,728,692 A | | 3/1988 | Sezaki et al. |
| 4,863,995 A | * | 9/1989 | Murakami et al. ............ 525/74 |
| 4,902,745 A | * | 2/1990 | Piejko et al. .................... 525/80 |
| 5,095,063 A | * | 3/1992 | Okada et al. ................. 524/413 |
| 5,331,046 A | | 7/1994 | Chang et al. |
| 5,367,021 A | * | 11/1994 | Roovers et al. ................ 525/67 |
| 5,494,745 A | | 2/1996 | Vander Velden et al. |
| 5,981,665 A | | 11/1999 | Vestberg et al. |
| 6,433,088 B1 | | 8/2002 | Saraf |
| 6,455,602 B1 | | 9/2002 | Maki et al. |
| 6,869,653 B2 | | 3/2005 | Ling et al. |

FOREIGN PATENT DOCUMENTS

| | | |
|---|---|---|
| EP | 0632071 A2 | 1/1995 |
| JP | 58-198529 A | 11/1983 |
| JP | 61-272217 A | 12/1986 |
| JP | 05-194843 A | 8/1993 |
| JP | 06-065438 A | 3/1994 |
| JP | 06-184212 A | 7/1994 |
| JP | 07-008903 A1 | 1/1995 |
| JP | 2001320424 | 11/2001 |
| JP | 2003-313332 A | 11/2003 |
| JP | 2004-51808 A | 2/2004 |
| KR | 1993-0012944 | 7/1993 |
| KR | 10-1995-0007662 B1 | 7/1995 |
| KR | 1019950007662 | 7/1995 |
| KR | 10-20000068009 A | 11/2000 |
| KR | 10-0395399 | 8/2003 |
| KR | 10-2001-0009459 A | 2/2005 |
| KR | 100866652 B1 | 11/2008 |
| WO | 00/36011 A | 6/2000 |
| WO | 2006/075906 A1 | 7/2006 |

* cited by examiner

*Primary Examiner* — Jeffrey C Mullis
(74) *Attorney, Agent, or Firm* — Lucas & Mercanti, LLP; Klaus P. Stoffel

(57) ABSTRACT

The present invention relates to a polypropylene-based composite composition which is directly paintable without treatment of a primer comprised of chlorinated polyolefins. According to the present invention, the polypropylene-based composite composition comprises 30 to 70 weight percent, based on total weight of said polypropylene-based composite composition, of a polypropylene-based resin; 10 to 20 weight percent, based on total weight of said polypropylene-based composite composition, of a polyolefin based thermoplastic elastomer; 10 to 30 weight percent, based on total weight of said polypropylene-based composite composition, of a mineral filler; and 10 to 20 weight percent, based on total weight of said polypropylene-based composite composition, of an acrylate functional polymer additive.

The composition does not need treatment of primer upon painting and thus has advantageous in terms of improvement of productivity resulting from reduction in production cost and production time and environment protection resulting from elimination of use of a primer comprised of chlorinated polyolefins.

9 Claims, 3 Drawing Sheets

DIRECTLY PAINTABLE POLYPROPYLENE-BASED COMPOSITE COMPOSITION

CROSS-REFERENCE TO RELATED APPLICATIONS

This application claims the benefit of Korean Patent Application No. 10-2005-0013104 filed Feb. 17, 2005, the contents of which are incorporated herein by reference.

BACKGROUND OF THE INVENTION

1. Field of the Invention

The present invention relates to a polypropylene-based composite composition. More particularly, it relates to a polypropylene-based composite composition which is directly paintable without need of treatment with a primer comprised of chlorinated polyolefins.

2. Background of the Related Art

Composites based on polypropylene have advantages such as excellent mechanical properties, processability and low production cost and thereby, have been developed into various products and applied to diverse applications. Particularly, their use is expanded to materials for interior/exterior of automobiles recently. Many parts of automobiles are made of these composites. However, they are disadvantageous in that when they are applied as an exterior material, painting and printing for surface decoration to satisfy the various requirements of consumers cannot be readily performed. Therefore, for painting a polypropylene-based composite, it is necessary to use a primer comprised of chlorinated polyolefins. The primer represented by chlorinated polyethylene or chlorinated polypropylene is a main cause of environment pollution and an increase of production cost and thus, various techniques have been developed to eliminate its use.

There has been known the molded-in-color method as a technology not needing primer treatment upon the painting of the polypropylene-based composite. This comprises mixing in a pigment during the production of the composite. It is advantageous in that it does not need an additional painting process but is disadvantageous in that it is difficult to express diverse colors and to control color and the productions cost of the composite is increased by increasing in the used amount of the pigment, dissimilarly to the painting technology.

Also, there has been developed a surface treatment technology to improve paint adhesion using flame plasma instead of primer treatment. This is aimed at providing with polarity for the surface by oxidizing the surface of a molded body of the polypropylene-based composite with high temperature flame plasma, thereby increasing adhesion strength with a paint. However, it has defects in that expensive plasma treatment equipments are additionally needed and due to characteristics of the plasma equipment, the treatment is not effectively done or overdone in an indented part and a weldline site formed upon moulding, whereby it is difficult to produce uniform paint adhesion and to thereby obtain a desired coating, dissimilarly to the primer treatment Also, Korean patent Publication No. 1998-0060232 disclosed a method including addition of a modified resin containing a polar group (maleic anhydride grafted polypropylene, maleic anhydride grafted ethylene-propylene rubber and the like) as a technique to develop a polypropylene-based composite without need of primer treatment by using a functional additive. This technique aimed to provide polarity to the surface of a polypropylene, composite by using a modified resin with high polarity, thereby improving paintability. However, there were defects such as increase of production cost and deterioration in properties of the composite resulting from use of the expensive modified polypropylene in a large amount.

Korean Patent Publication No. 1995-0011526 disclosed a technique for improving surface polarity of a polyolefin based composite by using a polyol with a particular chemical composition having a lot of hydroxyl functionality as an additive so that the composite is directly paintable. However, the technique has defects such as increase of production cost and deterioration in properties of the composite caused by use of the expensive additive.

U.S. Pat. No. 6,133,374 disclosed a technique to improve polarity of a composite material by using a method for blending a resin modified with a functional monomer such as unsaturated carboxylic acid or acid anhydride and an epoxy resin. This patent aimed to realize direct painting by introducing an epoxy resin, since the addition of a modified resin had a limit in improvement of surface polarity of a composite. However, there were problems such as increase of production cost caused by addition of the epoxy resin and deterioration in properties caused by lack of compatibility between the epoxy resin and the polypropylene resin.

SUMMARY OF THE INVENTION

Thus, the present invention has been made in order to solve the above problems involved in the prior art, and it is an object of the present invention to provide a novel polypropylene composite composition which is paintable without treatment of a primer while minimizing deterioration of properties such as mechanical properties and processability.

To achieve the above object, in one embodiment, the present invention provides a polypropylene-based composite composition comprising:

30 to 70 weight percent, based on total weight of said polypropylene-based composite composition, of a polypropylene-based resin;

10 to 20 weight percent, based on total weight of said polypropylene-based composite composition, of a polyolefin based thermoplastic elastomer;

10 to 30 weight percent, based on total weight of said polypropylene-based composite composition, of a mineral filler; and 10 to 20 weight percent, based on total weight of said polypropylene-based composite composition, of an acrylate functional polymer additive.

BRIEF DESCRIPTION OF THE DRAWINGS

The above and other objects, features and advantages of the present invention will be apparent from the following detailed description of the preferred embodiments of the invention in conjunction with the accompanying drawing, in which.

DETAILED DESCRIPTION OF THE PREFERRED EMBODIMENT

Figure 1:
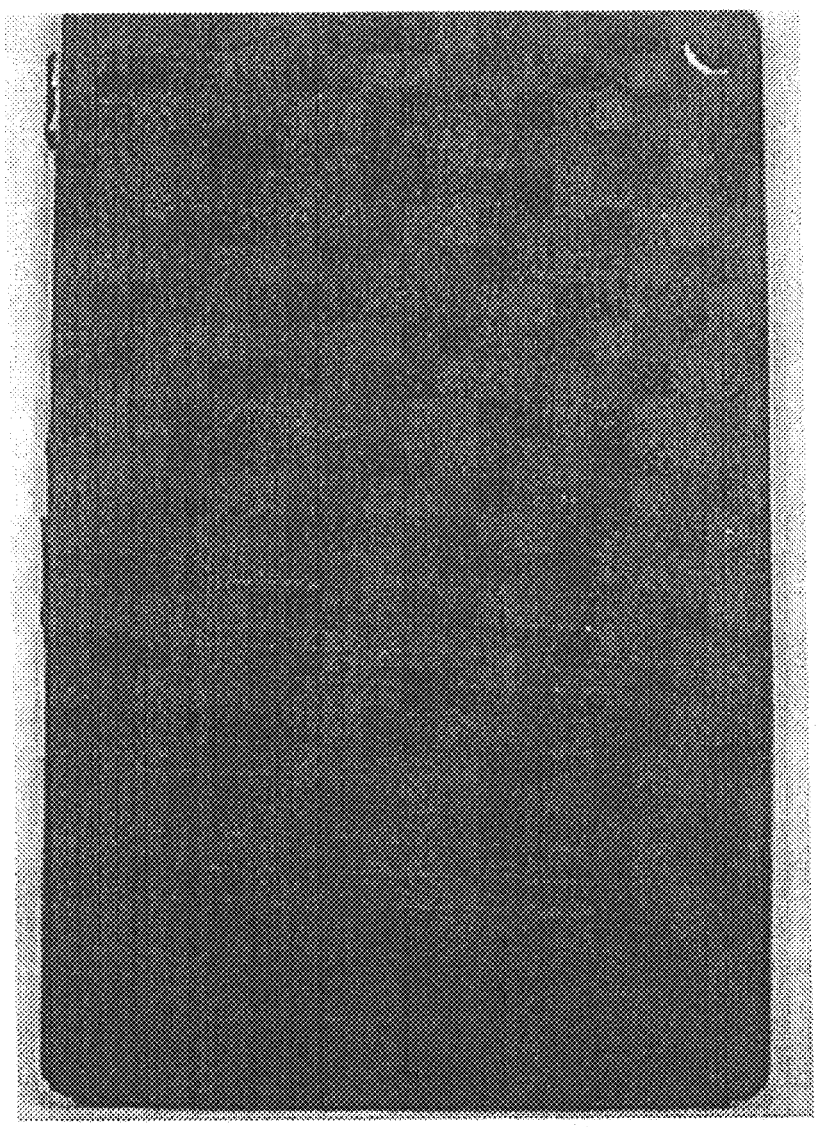
FIG. 1 shows the result of paintability evaluation of an injection molded specimen according to Example 1 of the present invention.

Now, the present invention is described in detail.

Examples of the polypropylene-based resin which can be used in the present invention include crystalline polypropylene homopolymers, propylene/ethylene random copolymers, propylene/ethylene block copolymers, or ethylene/propylene/α-olefin terpolymers. Among them the propylene/ethylene block copolymers having a melt index of 20~60 g/10 min (2.16 kg, 230° C.) is preferred. If the melt index is less than 20 g/10 min (2.16 kg, 230° C.) processability during injection molding is poor and if it exceeds 60 g/10 min (2.16 kg, 230° C.), mechanical properties of a final molded product is deteriorated.

Also, the polypropylene-based resin is preferably used in an amount of 30 to 70% by weight based on the total weight of the polypropylene-based composite composition. If the amount is less than 30% by weight, mechanical properties is deteriorated and if it exceeds 70% by weight, paintability of a final composite is deteriorated.

Examples of the polyolefin based thermoplastic elastomer include ethylene-propylene rubbers, ethylene-propylene-diene terpolymer rubbers or ethylene-octene copolymers, but are not limited thereto.

The polyolefin based thermoplastic elastomer is preferably used in an amount of 10 to 20% by weight based on the total weight of the polypropylene-based composite composition. When it is used in an amount of less than 10% by weight, impact strength of a final composite is deteriorated and if it is used in an amount of greater than 20% by weight, stiffness of the final composite is deteriorated.

Examples of the mineral filler include talc or calcium carbonate.

The mineral filler is preferably used in an amount of 10 to 30% by weight based on the total weight of the polypropylene-based composite composition. If the used amount is less than 10% by weight, stiffness of a final composite is deteriorated and if it exceeds 30% by weight, impact strength is deteriorated.

Preferred examples of the acrylate functional polymer additive which can be used in the present invention include polyacrylate copolymers/polyolefins, in which the polyacrylate copolymers are dispersed in the polyolefins.

The acrylate component in the polyacrylate copolymer is preferably at least two selected from the group consisting of alkylacrylate, hydroxyalkylacrylate, alkylmethacrylate and hydroxyalkylmethacrylate, but is not limited thereto.

The polyolefin component in the acrylate functional polymer additive is preferably polypropylene, but is not limited thereto.

The acrylate functional polymer additive is preferably used in an amount of 10 to 20% by weight based on the total weight of the polypropylene-based composite composition. If the amount is less than 10% by weight, paintability is poor and if it exceed 20% by weight, mechanical properties of a final composite are deteriorated.

An additive with poor fluidity, though having high surface polarity, fails to provide sufficient paintability. By using the acrylate functional polymer additive, it is possible to secure not only high surface polarity but also excellent fluidity.

Now, the present invention is explained in further detail using the following examples. However, it should be understood that these examples are only for illustrative purpose and the present invention is not limited thereto.

Example 1

A polypropylene-based composite composition was prepared using 59% by weight of a propylene-ethylene block copolymer having a melt index of 40 g/10 min (2.16 kg, 230° C.), as a polypropylene-based resin, 17% by weight of ethylene-propylene rubber (KP-020P, produced by Kumho Polychem Co., Ltd.), as a polyolefin based thermoplastic elastomer, 14% by weight of talc, as a mineral filler, and 10% by weight of a polyacrylate copolymer/polypropylene-based functional polymer additive, produced by Polymersnet Co., Ltd., as an acrylate functional polymer additive. The polyacrylate copolymer was a copolymer of butylacrylate, hydroxypropylacrylate and methylmethacrylate, dispersed in polypropylene.

The composition was injection molded at an injection temperature of 200 to 220° C. and a mold temperature of 30° C. using an injection molding machine (SELEX E150, Woojin Selex Co., Ltd.) to form a specimen in the form of a plate having a dimension of 110 mm×70 mm×3 mm. The specimen was spray-coated with a paint which was commonly applied to a bumper fascia for automobiles and then, evaluated for paintability by performing the peel-off test using a pressure sensitive adhesive tape.

The content of each component of the polypropylene-based composite composition and various properties of the injection molded specimen prepared from the composition are shown in Table 1 and the result of the paintability evaluation is shown in FIG. 1.

Example 2

A polypropylene-based composite composition was prepared using 56% by weight of a propylene-ethylene block copolymer having a melt index of 40 g/10 min (2.16 kg, 230° C.), as a polypropylene-based resin, 15% by weight of ethylene-propylene rubber (KP-020P, produced by Kumho Polychem Co., Ltd.), as a polyolefin based thermoplastic elastomer, 14% by weight of talc, as a mineral filler, and 15% by weight of a polyacrylate copolymer/polypropylene-based functional polymer additive, produced by Polymersnet Co., Ltd., as an acrylate functional polymer additive. The polyacrylate copolymer was a copolymer of butylacrylate, hydroxypropylacrylate and methylmethacrylate dispersed in polypropylene.

By the same procedures as described for Example 1, the composition was injection molded to form a specimen in the form of a plate and the specimen was subjected to the peel-off test using a pressure sensitive adhesive tape to evaluate its paintability.

Figure 2:
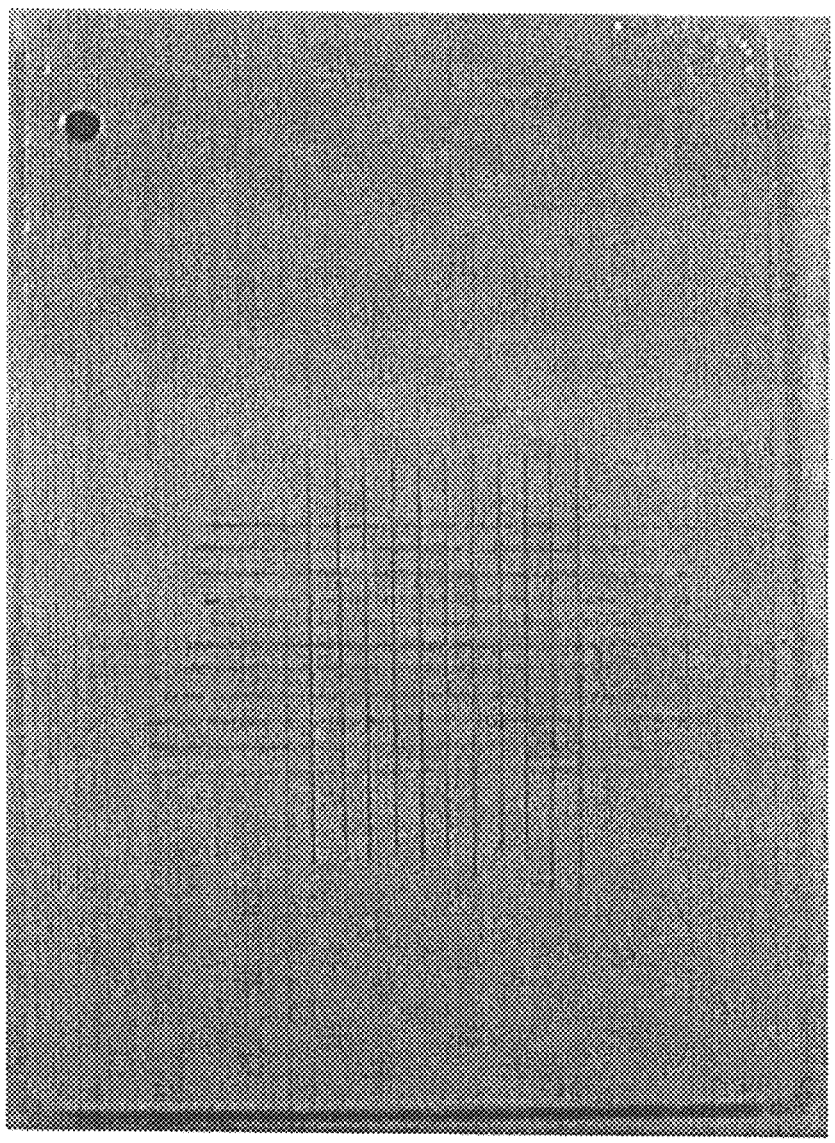
FIG. 2 shows the result of paintability evaluation of an injection molded specimen according to Example 2 of the present invention.

The content of each component of the polypropylene-based composite composition and various properties of the injection molded specimen prepared from the composition are shown in Table 1 and the result of the paintability evaluation is shown in FIG. 2.

Comparative Example 1

A polypropylene-based composite composition was prepared using 65% by weight of a propylene-ethylene block copolymer having a melt index of 40 g/10 min (2.16 kg, 230° C.), as a polypropylene-based resin, 23% by weight of ethylene-propylene rubber (KP-020P, produced by Kumho Polychem Co., Ltd.), as a polyolefin based thermoplastic elastomer, and 12% by weight of talc, as a mineral filler, without using an acrylate functional polymer additive.

By the same procedures as described for Example 1, the composition was injection molded to form a specimen in the form of a plate and the specimen was subjected to the peel-off test using a pressure sensitive adhesive tape to evaluate its paintability.

Figure 3:
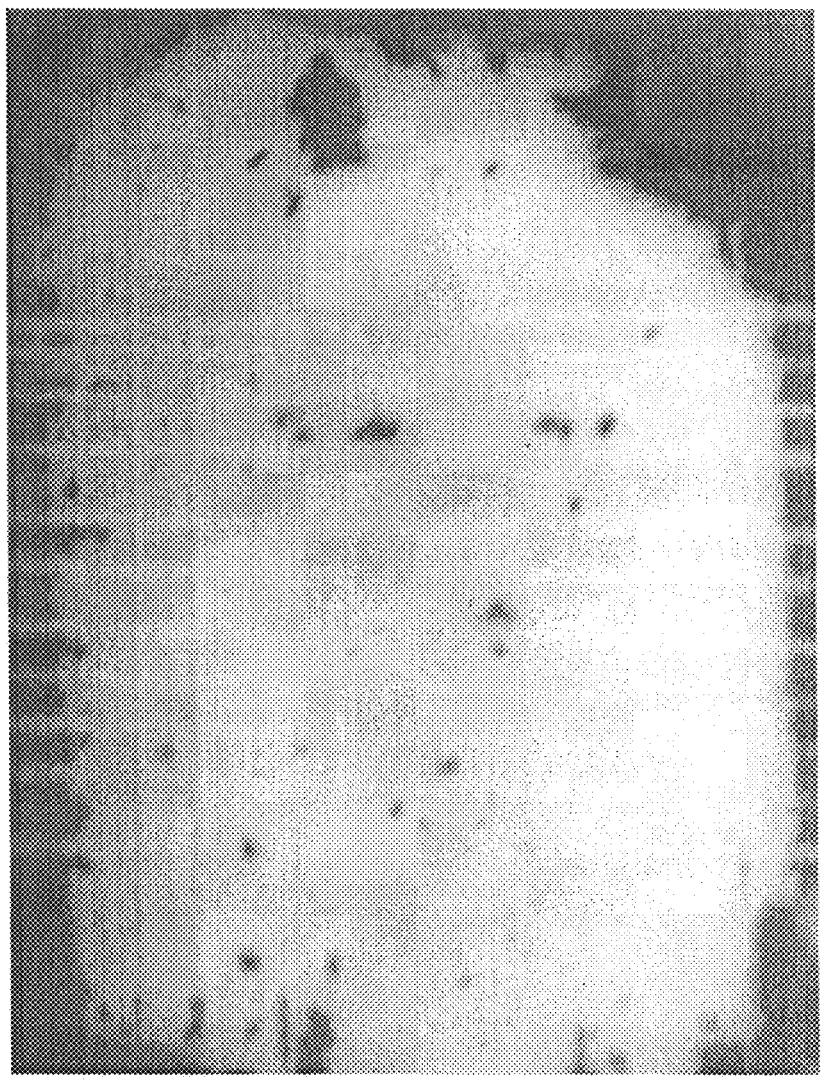
FIG. 3 shows the result of paintability evaluation of an injection molded specimen according to Comparative Example 1.

The content of each component of the polypropylene-based composite composition and various properties of the injection molded specimen prepared from the composition are shown in Table 1 and the result of the paintability evaluation is shown in FIG. 3.

TABLE 1

| Category | Test method (ASTM) | Unit | Comp. Ex. 1 | Ex. 1 | Ex. 2 |
| --- | --- | --- | --- | --- | --- |
| Composition | Polypropylene-based resin | Wt % | 65 | 59 | 56 |
| | Polyolefin based thermoplastic elastomer | | 23 | 17 | 15 |
| | Talc | | 12 | 14 | 14 |
| | Acrylate functional polymer | | — | 10 | 15 |
| Melt index | D1238 | g/10 min | 13.2 | 13.7 | 13.9 |
| Specific gravity | D792 | g/cm$^3$ | 0.97 | 1.00 | 1.01 |
| Tensile strength | D638 | kgf/cm$^2$ | 178 | 195 | 175 |
| Elongation at break | D638 | % | 180 | 500 | 400 |
| Flexural modulus | D790 | kgf/cm$^2$ | 12,700 | 12,600 | 11,900 |
| Impact strength | D256 | kgf-cm/cm | N/B* | N/B | N/B |

N/B*: (Non-Break)

By the composition according to the present invention, it is possible to eliminate a need for treatment with a primer upon the painting while minimizing deterioration of performances such as mechanical properties and processability. Thus, the present invention is advantageous in terms of improvement of productivity resulting from reduction in production cost and production time and environment protection resulting from elimination of use of a chlorine primer.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A polypropylene-based composite composition comprising
   a) 30 to 70 weight percent of a polypropylene-based resin;
   b) 10 to 20 weight percent of a polyolefin based thermoplastic elastomer;
   c) 10 to 30 weight percent of a mineral filler; and
   d) 10 to 20 weight percent of an acrylate based functional polymer additive,
   wherein
   the acrylate based functional polymer additive includes a polyacrylate copolymer and a polyolefin, wherein the polyacrylate copolymer is dispersed in the polyolefin and the polyacrylate copolymer is a copolymer of butylacrylate, hydroxypropylacrylate and methylmethacrylate; and
   the weight percentages are based on the total weight of the polypropylene-based composite composition.

2. The composition according to claim 1, wherein the polypropylene-based resin is a crystalline polypropylene homopolymer, a propylene/ethylene random copolymer, a propylene/ethylene block copolymer, or an ethylene/propylene/a-olefin terpolymer.

3. The composition according to claim 1, wherein the polypropylene-based resin is a propylene/ethylene block copolymer having a melt index of 20 to 60 g/10 min (2.16 kg, 230° C.).

4. The composition according to claim 1, wherein the polyolefin based thermoplastic elastomer is an ethylene-propylene rubber, an ethylene-propylene-diene terpolymer rubber or an ethylene-octene copolymer.

5. The composition according to claim 1, wherein the mineral filler is talc or calcium carbonate.

6. The composition according to claim 1, comprising:
   (a) 59 weight percent of a polypropylene-ethylene block copolymer;
   (b) 17 weight percent of an ethylene-propylene rubber;
   (c) 14 weight percent of a talc; and
   (d) 10 weight percent of an acrylate based functional polymer additive,
   wherein
   the acrylate based functional polymer additive includes a polyacrylate copolymer and a polyolefin, wherein the polyacrylate copolymer is dispersed in the polyolefin;
   the polyacrylate copolymer is a copolymer of butylacrylate, hydroxypropylacrylate and methylmethacrylate;
   the polypropylene-ethylene block copolymer has a melt index of 20 to 60 g/10 min (2.16 kg, 230° C.); and
   the weight percentages are based on the total weight of the polypropylene-based composition.

7. The composition according to claim 6, wherein the acrylate based functional polymer additive includes a polyacrylate copolymer and polypropylene and the polyacrylate copolymer is dispersed in the polypropylene.

8. The composition according to claim 1, comprising:
   (a) 56 weight percent of a polypropylene-ethylene block copolymer;
   (b) 15 weight percent of an ethylene-propylene rubber;
   (c) 14 weight percent of a talc; and
   (d) 15 weight percent of an acrylate based functional polymer additive,
   wherein
   the acrylate based functional polymer additive includes a polyacrylate copolymer and a polyolefin, wherein the polyacrylate copolymer is dispersed in the polyolefin;
   the polyacrylate copolymer is a copolymer of butylacrylate, hydroxypropylacrylate and methylmethacrylate;
   the polypropylene-ethylene block copolymer has a melt index of 20 to 60 g/10 min (2.16 kg, 230° C.); and
   the weight percentages are based on the total weight of the polypropylene-based composition.

9. The composition according to claim 8, wherein the acrylate based functional polymer additive includes a polyacrylate copolymer and polypropylene and the polyacrylate copolymer is dispersed in the polypropylene.

* * * * *